(12) United States Patent
Miao

(10) Patent No.: US 11,802,026 B2
(45) Date of Patent: Oct. 31, 2023

(54) CONTAINER SIDE LOADER

(71) Applicant: Linzhan Miao, Zhejiang (CN)

(72) Inventor: Linzhan Miao, Zhejiang (CN)

( * ) Notice: Subject to any disclaimer, the term of this patent is extended or adjusted under 35 U.S.C. 154(b) by 559 days.

(21) Appl. No.: 15/734,095

(22) PCT Filed: Nov. 29, 2019

(86) PCT No.: PCT/CN2019/122018
§ 371 (c)(1),
(2) Date: Dec. 1, 2020

(87) PCT Pub. No.: WO2021/102923
PCT Pub. Date: Jun. 3, 2021

(65) Prior Publication Data
US 2021/0316969 A1    Oct. 14, 2021

(51) Int. Cl.
*B66C 19/00* (2006.01)
*B66F 9/18* (2006.01)
*B66F 9/12* (2006.01)

(52) U.S. Cl.
CPC ............ *B66C 19/007* (2013.01); *B66F 9/125* (2013.01); *B66F 9/186* (2013.01)

(58) Field of Classification Search
CPC .......... B65G 2201/0235; B65G 63/004; B65G 63/025; B65G 63/045; B65G 63/065; B65G 67/04; B66F 9/186; B66F 9/125; B66C 19/007; B66C 1/101
See application file for complete search history.

(56) References Cited

U.S. PATENT DOCUMENTS

| 3,589,540 | A | * | 6/1971 | Kinross | B66F 9/10 294/81.4 |
| 4,017,110 | A | * | 4/1977 | Pease | B66F 9/186 414/785 |
| 4,402,543 | A | * | 9/1983 | Simpson | B66F 9/186 294/81.53 |
| 2015/0030422 | A1 | * | 1/2015 | Karlsson | B66F 9/16 414/620 |

FOREIGN PATENT DOCUMENTS

| CN | 2188087 | Y | | 1/1995 | | |
| CN | 104176623 | A | | 12/2014 | | |
| CN | 106927371 | A | | 7/2017 | | |
| CN | 107188088 | A | | 9/2017 | | |
| CN | 107601077 | A | * | 1/2018 | ........... | B65G 47/248 |
| CN | 207404532 | U | | 5/2018 | | |
| CN | 108657934 | A | | 10/2018 | | |
| CN | 110759283 | A | * | 2/2020 | ........... | B66C 19/007 |
| CN | 211496818 | U | * | 9/2020 | ........... | B66C 19/007 |
| JP | 2017001759 | A | | 1/2017 | | |

* cited by examiner

Primary Examiner — Kaitlin S Joerger

(57) ABSTRACT

The present invention relates to the technical field of container handling, and more particular to a container side loader. The container side loader includes a base, a combined gantry, a sling, and a plurality of control mechanisms such as lifting, rotation, inclination, control mechanisms and the like. The loader can directly perform container side handling on various freight platforms of an electrical railway line, and has the functions of moving and conveying a heavy container, overturning and unloading an inverted container, overturning and loading a vertical container, and stacking two layers of heavy containers.

10 Claims, 16 Drawing Sheets

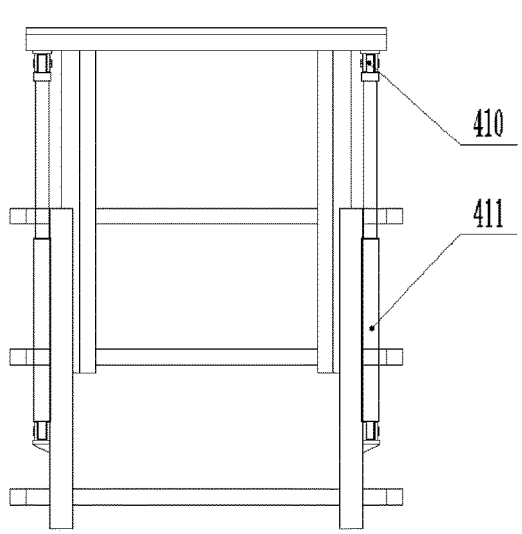
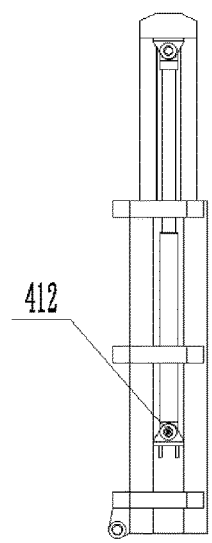
Fig. 4a　　　　Fig. 4b
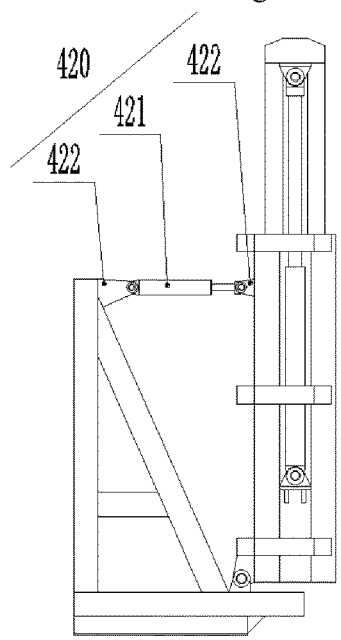
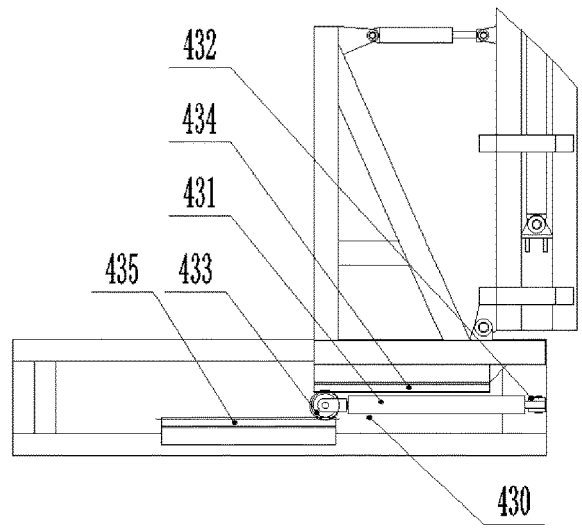
Fig. 5　　　　Fig. 6
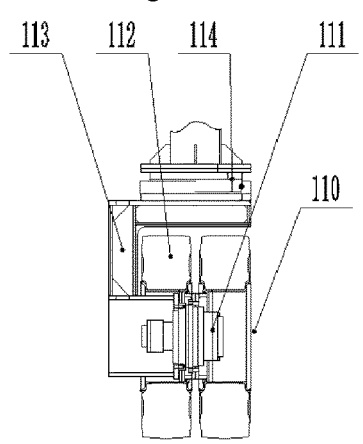
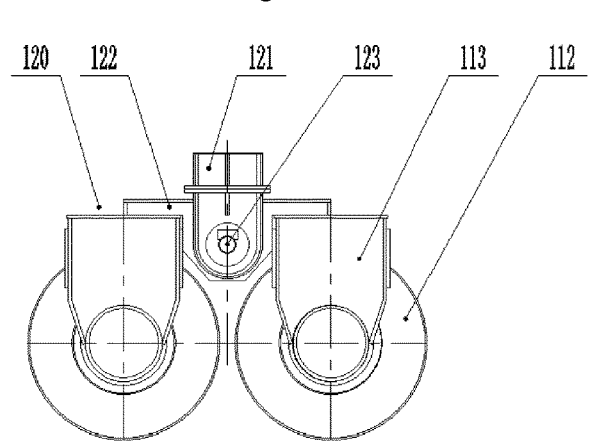
Fig. 7a　　　　Fig. 7b

CONTAINER SIDE LOADER

TECHNICAL FIELD

The present invention relates to the technical field of container handling, and more particular to a container side loader which can be used on a freight platform of an electrical railway line.

BACKGROUND

Multi-modal transport of containers is an important part of modern railway logistics. At present, the scale of Chinese multi-modal transport is much lower than that in western countries. Therefore, the logistics cost in China is much higher than that in logistics developed countries such as the United States, European countries and the like. Furthermore, China also has the problems such as insufficient number of railway container handling stations, small scale for most of the stations, deficient handling capacity and the like. More importantly, a large number of freight platforms after electrification transformation do not have the ability to directly load and unload heavy containers due to the existence of a contact power grid (an overhead contact system or a high voltage line) of an electric traction system. An overhead contact system is generally disposed lower than 6.5 m above a rail; and therefore, conventional handing devices, such as a container reach stacker and a gantry crane which need to occupy the space above a train, cannot operate in practical. If a container handling station needs to be opened, the contact power grid must be dismantled or the route of the high voltage line must be changed. However, such reconstruction has the disadvantages of long construction period, great investment waste, high operation cost, environmental hazards and the like.

Therefore, the present application designs a container side loader capable of overcoming the above defects, directly loading and unloading a heavy container on various freight platforms of an electrical railway line, and integrating the functions of container side handling, moving and conveying a heavy container, overturning and unloading an inverted container, overturning and loading a vertical container, and stacking two layers of heavy containers.

SUMMARY OF THE INVENTION

The object of the present application is to provide a container side loader capable of directly loading and unloading a heavy container on various freight platforms of an electrical railway line, and integrating the functions of container side handling, moving and conveying a heavy container, overturning and unloading an inverted container, overturning and loading a vertical container, and stacking two layers of heavy containers. The present application has the comprehensive characteristics of low investment, wide application, high efficiency, low cost, small space, high safety and operability and the like. To achieve the above object, the technical solution adopted by the present application is:

A container side loader, including a base mechanism, a steering and driving wheel assembly, a fixed and combined wheel assembly, a synchronously-steering assembly, a power system, a combined gantry mechanism, a sling mechanism, a sling hoisting mechanism, a sling vertical-rotation mechanism, a sling horizontal-adjustment mechanism, an intermediate gantry lifting mechanism, a combined gantry inclination mechanism, and a combined gantry translation mechanism.

The steering and driving wheel assembly and the fixed and combined wheel assembly form a wheel drive assembly of the loader, and are main functional components for movement and operation of the entire machine.

The synchronously-steering assembly is a main functional component for the linear and steering operation of the entire machine, and adjusts, by means of the extension and retraction of a synchronously-steering cylinder, a distance between idle ends of two synchronously-steering links of the synchronously-steering assembly.

The combined gantry mechanism is a main structural assembly for bearing the operation of the entire machine; the sling mechanism is an automatic telescopic sling capable of automatically extending and retracting to match containers in different sizes, and is assembled on the combined gantry mechanism; the sling hoisting mechanism is used to control the hoisting of the sling; the sling vertical-rotation mechanism and the sling horizontal-adjustment mechanism are respectively used to adjust the vertical and horizontal positions of the sling.

The intermediate gantry lifting mechanism, the combined gantry inclination mechanism, and the combined gantry translation mechanism are respectively used to control the lift, inclination and translation of the sling.

The power system is an operation power and control center of the entire machine, consists of a power system assembly, a hydraulic control assembly, an electric control assembly, a wireless remote control, and a machine room cover assembly, and is mounted above the combined wheel bearing mechanism of the base mechanism.

Preferably, the base mechanism includes a steering wheel bearing mechanism, a combined wheel bearing mechanism, an intermediate connector, and a counterweight assembly; the intermediate connector includes an upper bearing track, a lower bearing track, a rack beam, and a connecting beam; the upper bearing tracks and the lower bearing tracks are respectively two, and are arranged in parallel with each other; and the steering wheel bearing mechanism and the combined wheel bearing mechanism are respectively disposed on the two sides of the upper bearing track and the lower bearing track, so as to form a rectangular base main-frame.

Preferably, the steering wheel bearing mechanism is disposed on the inner side of the base, and the combined wheel bearing mechanism is disposed on the outer side of the base, wherein the outer side refers to the loading side of the container; furthermore, the counterweight assembly is disposed on the outer side adjacent to the combined wheel bearing mechanism; and the rack beam is disposed on the main frame of the base mechanism.

Preferably, the steering and driving wheel assembly includes a wheel drive apparatus, a double-tyre rim combination, a right angle support structure, and a toothless slewing bearing; and the fixed and combined wheel assembly includes a fixed support base, a combined balance cross-beam, a swing support center shaft, a double-tyre rim combination, and a right angle support structure.

Preferably, the synchronously-steering assembly includes a synchronously-steering cylinder, a steering cylinder support, a synchronously-steering link, a synchronously-steering rack, a synchronously-steering gear, a rack slide way assembly, and a mechanism mounting base.

Preferably, the combined gantry mechanism includes a main-post outer-gantry assembly, an intermediate gantry cross-beam assembly, a combined gantry canting-pull assembly, and a combined gantry connection hinge shaft.

Preferably, the intermediate gantry cross-beam assembly includes an intermediate gantry post, an intermediate gantry cross-beam, and an intermediate gantry slide block.

Preferably, the combined gantry canting-pull assembly includes a canting-pull structure combination, a canting-pull structure bottom-beam, bearing side cross-beam, a bearing wearable slide block, and an upper rack mounting base beam.

Preferably, the sling mechanism includes a sling structure assembly, a sling extension and retraction mechanism, a sling twist lock mechanism, and a container door opening/closing mechanism.

Preferably, the sling hoisting mechanism includes a hoisting frame combination structure, a hoisting crane plate type chain, a frame bearing wearable slide block, a plat type chain bearing pulley, a plat type chain fixing end portion, and a plat type chain pulley support.

Preferably, the sling vertical-rotation mechanism includes a sling rotation cylinder, a rotation cylinder support, a toothless slewing large-bearing, and a bearing mounting base.

The sling horizontal-adjustment mechanism includes a horizontal adjustment cylinder, an adjustment cylinder support, and a horizontal adjustment hinge shaft.

Preferably, the intermediate gantry lifting mechanism includes a gantry lift cylinder and a lift cylinder support; when the gantry lift cylinder extends and retracts, the intermediate gantry cross-beam assembly is driven to move up and down, then the hoisting frame combination structure is driven to move up and down, and finally the sling mechanism moves up and down.

Preferably, the combined gantry inclination mechanism includes a gantry inclination cylinder and an inclination cylinder support; when the gantry inclination cylinder extends and retracts, a combined gantry structure assembly is driven to rotate around the combined gantry connection hinge shaft and inclines, and finally the sling mechanism inclines forward, so as to satisfy a requirement for alignment and unlocking of a sling twist lock and a container hoisting hole.

Preferably, the combined gantry translation mechanism includes a gantry translation cylinder, a translation cylinder support, a cylinder head gear, an upper moving rack, and a lower fixed rack. When the gantry translation cylinder extends and retracts, the cylinder head gear drives the upper moving rack to move left and right relative to the lower fixed rack, and then drives the combined gantry structure assembly to entirely move left and right, so as to finally satisfy a requirement for the left and right movement of the sling mechanism and the loaded container.

The container side loader of the present invention can directly perform container side handling on various freight platforms of an electrical railway line, and has multiple functions such as moving and conveying a heavy container, overturning and unloading an inverted container, overturning and loading a vertical container, and stacking two layers of heavy containers. The present invention has the comprehensive characteristics of low investment, wide application, high efficiency, low cost, small space, high safety and operability and the like.

The loader is a container handling machine specially satisfying the requirement for the use on various freight platforms of an electrical railway line, and is also a container side loader integrating the functions of container side handling, moving and conveying a heavy container, overturning and unloading an inverted container, overturning and loading a vertical container, and stacking two layers of heavy containers.

BRIEF DESCRIPTION OF THE DRAWINGS

FIGS. 2a-2c are structural schematic views of the base in the embodiment as shown in FIG. 1, wherein FIG. 2a is a vertical structural schematic view, FIG. 2b is a side view, and FIG. 2c is a schematic view of an inner side;

FIGS. 3a-3d are structural schematic views of the intermediate gantry cross-beam assembly in the embodiment as shown in FIG. 1, wherein FIG. 3a is a structural schematic view of an inner side at the topmost position, FIG. 3b is a side structural schematic view, FIG. 3c is a structural schematic view at the lowermost position in FIG. 3a, and FIG. 3d is a vertical structural schematic view of the main structure thereof;

FIGS. 4a-4b are structural schematic views of the intermediate gantry lifting mechanism in the embodiment as shown in FIG. 1, wherein FIG. 4a is a structural schematic view of an inner side at the topmost position, and FIG. 4b is a side structural schematic view;

FIG. 5 is a structural schematic view of the combined gantry inclination mechanism in the embodiment as shown in FIG. 1, and is a side schematic view;

FIG. 6 is a structural schematic view of the combined gantry translation mechanism in the embodiment as shown in FIG. 1, and is also a side schematic view;

FIGS. 7a-7b are structural schematic views of the steering and driving wheel assembly and the fixed and combined wheel assembly in the embodiment as shown in FIG. 1, wherein FIG. 7a is a structural schematic view of the steering and driving wheel assembly, and FIG. 7b is a structural schematic view of the fixed and combined wheel assembly;

FIGS. 8a-8d are structural schematic views of the synchronously-steering assembly in the embodiment as shown in FIG. 1, wherein FIG. 8a is a schematic view showing the cooperation thereof with two steering and driving wheel assemblies, FIGS. 8b and 8c are side and bottom structural schematic view, and FIG. 8d is a sectional structural schematic view of the mechanism mounting base;

FIGS. 9a-9c are operating schematic views of the synchronously-steering assembly as shown in FIG. 8, wherein FIG. 9a is a schematic view in a horizontal state, FIG. 9b is a schematic view in a turn-left state, and FIG. 9c is a schematic view in a turn-right state;

FIGS. 10a-10c are structural schematic views of the sling mechanism and the container (the rectangular box denoted with a dotted line) as shown in FIG. 1, wherein FIGS. 10a, 10b, and 10c are respectively structural schematic views showing the cooperation on an inner side, at the top and on a lateral surface;

DETAILED DESCRIPTION OF THE PREFERRED EMBODIMENTS

Figure 1:
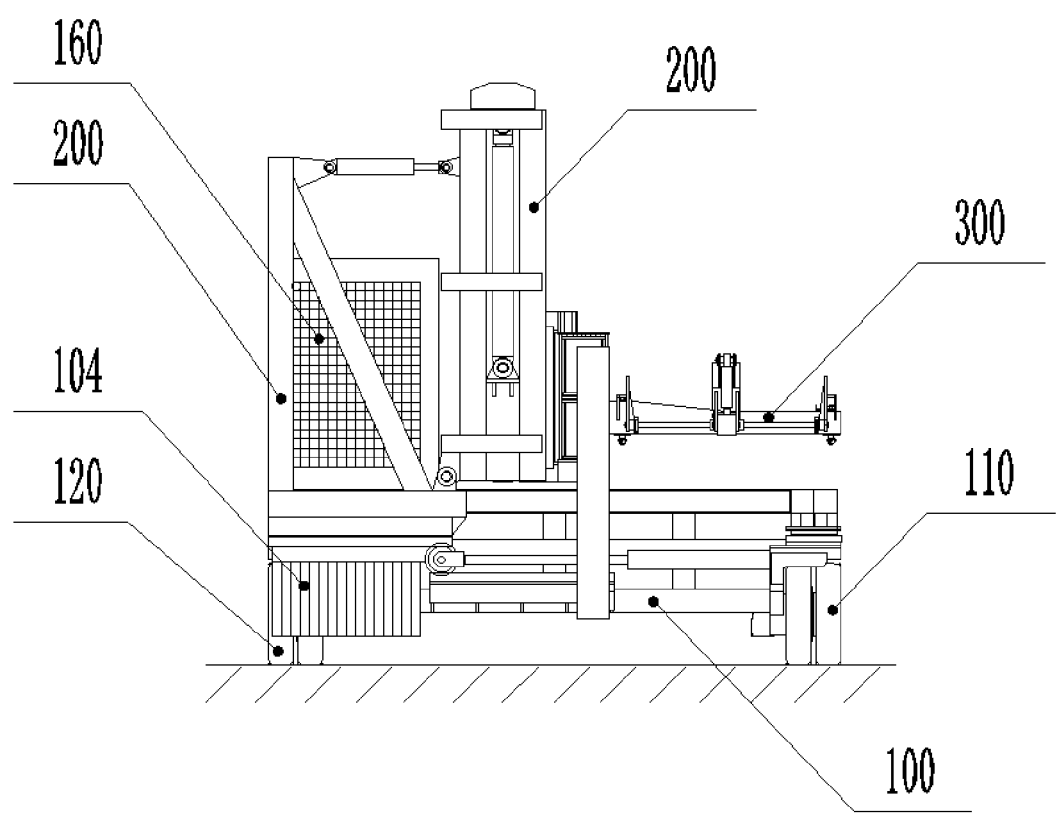
FIG. 1 is a structural schematic view of a lateral surface of a loader according to one embodiment of the present invention.

In order to enable a person skilled in the art to better understand the present invention and more clearly define the protection scope of the present invention, the present invention will be described in detail hereafter in combination with specific embodiments of the present invention. It should be noted that the following specific embodiments are only a part of the embodiments of the present invention without departing from the concept of the present invention, the specific and direct descriptions with regard to relevant structures are only intended to facilitate the understanding of the present invention, and the specific features do not duly or directly define the implementation scope of the present invention. The conventional selections and substitutions made by a person skilled in the art under the guide of the concept of the present invention should be all concluded in the protection scope of the present invention.

A container side loader, including a base mechanism 100, a steering and driving wheel assembly 110, a fixed and combined wheel assembly 120, a synchronously-steering assembly 150, a power system 160, a combined gantry mechanism 200, a sling mechanism 300, a sling hoisting mechanism 310, a sling vertical-rotation mechanism 320, a sling horizontal-adjustment mechanism 330, an intermediate gantry lifting mechanism 410, a combined gantry inclination mechanism 420, and a combined gantry translation mechanism 430.

Figure 2A:
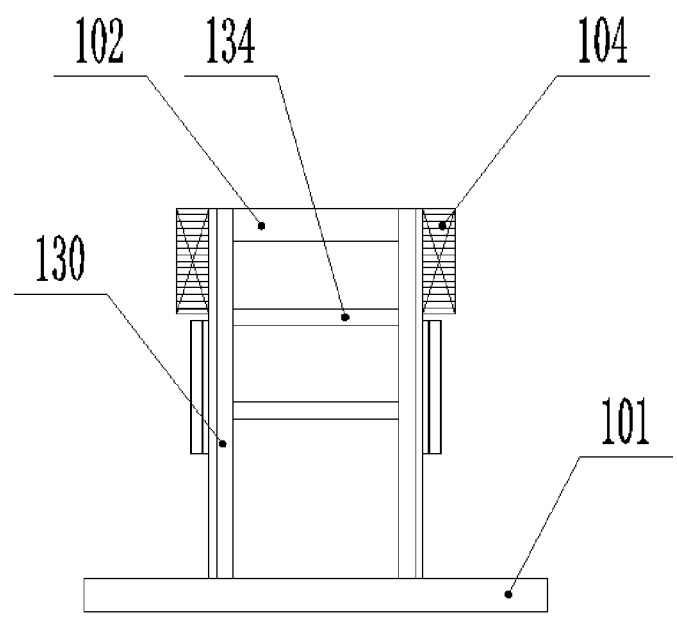
Figure 2B:
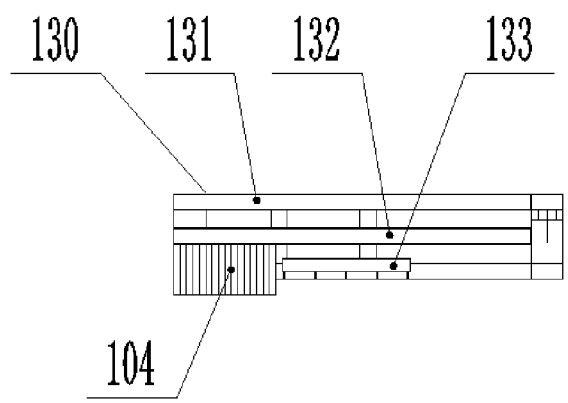
Figure 2C:
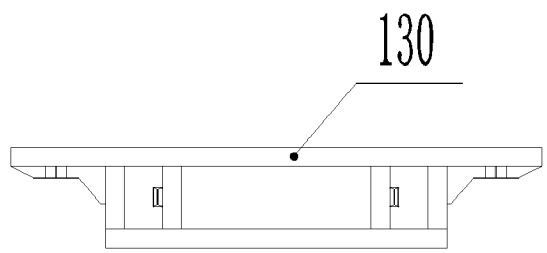

As shown in FIGS. 1 and 2, the base mechanism 100 has an overall support effect for the entire machine, and includes a steering wheel bearing mechanism 101, a combined wheel bearing mechanism 102, an intermediate connector 130, and a counterweight assembly 104; the intermediate connector 130 further includes an upper bearing track 131, a lower bearing track 132, a rack beam 133, and a connecting beam 134; the upper bearing tracks 131 and the lower bearing tracks 132 are respectively two, and are arranged in parallel with each other; and the steering wheel bearing mechanism 101 and the combined wheel bearing mechanism 102 are respectively disposed on the two sides of the upper bearing track 131 and the lower bearing track 132, so as to form a rectangular base main-frame. Certainly, the base frame is not necessarily in a regular rectangular shape. Under the situation of ensuring the strength of the overall structure, the positions of the steering wheel bearing mechanism 101, the combined wheel bearing mechanism 102, the upper bearing track 131, and the lower bearing track 132 can be appropriately changed, which is commonly known and feasible. The structural assemblies can be independently dismantled and assembled, so as to satisfy the requirements for transition and transportation.

In a preferred embodiment, the steering wheel bearing mechanism 101 is disposed on the inner side of the base 100, and the combined wheel bearing mechanism 102 is disposed on the outer side of the base, wherein the outer side refers to the loading side of the container; furthermore, the counterweight assembly 104 is disposed on the outer side adjacent to the combined wheel bearing mechanism 102, such that the overall counterweight of the base is reasonable, and the wheel bears a force as small as possible during steering, so as to reduce the wearing to the wheel, and extend service life. The rack beam 133 is disposed on the main frame of the base mechanism 100 without limiting specific positions as long as the rack beam does not conflict with the other components and can realize the functions thereof. For example, as shown in FIG. 2b, the rack beam is disposed under the lower bearing track 132.

As shown in FIG. 7, the steering and driving wheel assembly 110 includes a wheel drive apparatus 111, a double-tyre rim combination 112, a right angle support structure 113, and a toothless slewing bearing 114; the wheel drive apparatus 111 is preferably a hydraulic motor. The fixed and combined wheel assembly 120 includes a fixed support base 121, a combined balance cross-beam 122, a swing support center shaft 123, a double-tyre rim combination 112, and a right angle support structure 113. Wherein the steering and driving wheel assembly 110 can rotate, in a universal wheel manner, around a vertical axis thereof via the toothless slewing bearing 114; the fixed and combined wheel assembly 120 is fixed, and cannot rotate around the vertical central axis thereof furthermore, the fluctuation and instability of the entire machine due to an uneven ground road can be reduced via by combined balance cross-beam 122 and the swing support center shaft 123; and the approximate three-point support design can provide the maximum stability and ensure all the wheels to drive on the ground safely. The wheels used by the two are both the double-tyre rim combination 112, and the components for fixing the wheels are both the right angle support structure 113.

The steering and driving wheel assembly 110 and the fixed and combined wheel assembly 120 form a wheel drive assembly of the loader, and are main functional components for movement and operation of the entire machine; the steering and driving wheel assembly 110 and the fixed and combined wheel assembly 120 on the left and right sides adopt independent power structures, and can realize speed reduction, speed regulation, and zero speed brake by means of the cooperative operations of the power system assembly, the hydraulic control assembly, the electric control assembly, and the wireless remote control of the power system 160.

Figure 9A:
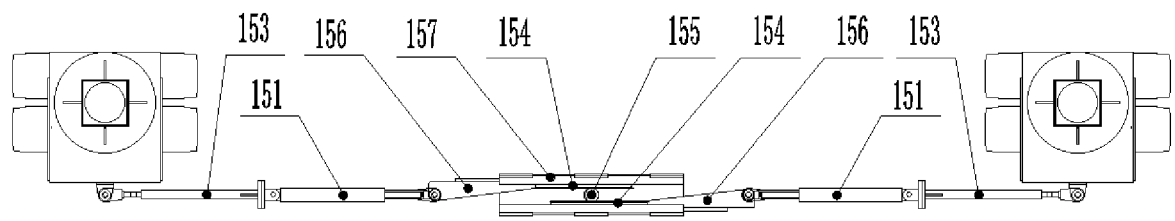
Figure 9B:
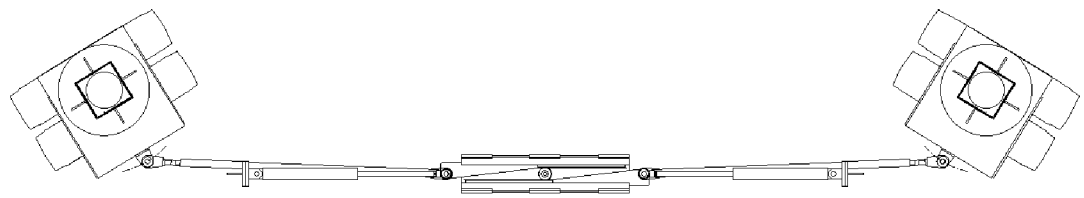
Figure 9C:
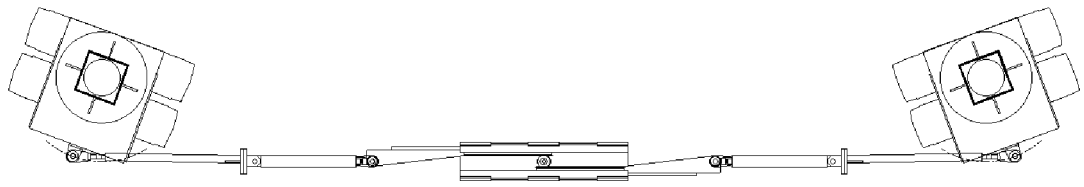

As shown in FIG. 8, the synchronously-steering assembly 150 is a main functional component for the linear and steering operation of the entire machine, and includes a synchronously-steering cylinder 151, a steering cylinder support 152, a synchronously-steering link 153, a synchronously-steering rack 154, a synchronously-steering gear 155, a rack slide way assembly 156, and a mechanism mounting base 157. The synchronously-steering cylinders 151 are two; the steering cylinder support 152 is fixed at the bottom of the base mechanism 100; one end of the synchronously-steering cylinder 151 is fixedly connected to the steering cylinder support 152, and the other end is fixed to the synchronously-steering link 153 and the rack slide way assembly 156; the synchronously-steering gear 155 is disposed in the mechanism mounting base 157; two synchronously-steering racks 154 are both disposed in the mechanism mounting base 157, and are matched with each other via the synchronously-steering gear 155; the synchronously-steering rack 154 is connected to the rack slide way assembly 156; idle ends of the synchronously-steering link 153 are respectively connected to the two steering and driving wheel assemblies 110, to be more specific, connected to the right angle support structures 113 of the two steering and driving wheel assemblies 110, such that the synchronously-steering assembly 150 can change length to drive the two steering and driving wheel assemblies 110 to correspondingly rotate. Therefore, the synchronously-steering cylinder 151 can extend and retract to adjust the distance between the idle ends of two synchronously-steering links 153 of the synchronously-steering assembly 150; the synchronously-steering rack 154 and the rack slide way assembly 156 on the two sides, and synchronously-steering gear 155 disposed in the middle perform mechanical forced synchronization, so as to realize absolutely synchronous and symmetric steering of the two steering and driving wheel assemblies 110. When the synchronously-steering cylinder is in an initial state, the synchronously-steering assembly 150 is in a horizontal state as shown in FIG. 9a; when the synchronously-steering cylinder retracts, the synchronously-steering assembly 150 is in a turn-left state as shown in FIG. 9b; and when the synchronously-steering cylinder extends, the synchronously-steering assembly 150 is in a turn-right state as shown in FIG. 9c.

Furthermore, when the left and right synchronously-steering cylinders 151 are forced to do mechanical actions, the synchronously-steering link 153 and the synchronously-steering rack 154 can be driven to symmetrically extend and retract and do synchronous actions, and then the left and right steering and driving wheel assemblies 110 are driven to symmetrically rotate around the vertical central axis, thus satisfying the requirements for the pure rolling and stability of the wheel during steering operation of the entire machine.

The power system 160 is an operation power and control center of the entire machine, consists of a power system assembly, a hydraulic control assembly, an electric control assembly, a wireless remote control, and a machine room cover assembly, and is mounted above the combined wheel bearing mechanism 102 of the base mechanism 100. Wherein the power system assembly is a power supply center of the entire machine; the hydraulic control assembly provides operation power for all the mechanisms and apparatuses, and the capacity thereof satisfies a requirement for the operation of the entire machine; the hydraulic control assembly is also a control center of all the hydraulic elements, and is used for the action operation of the mechanisms; the electric control assembly consists a PLC program controller and various electric switching elements; the wireless remote control is a component for controlling the operations of the entire machine, such as steering, loading and unloading, overturning, sling acting, opening/closing the container door and the like, and is used to complete and realize various operation actions of the entire machine; and the machine room cover assembly is a protective facility of the above system assemblies, and satisfies a safety protection requirement.

As shown in FIG. 3, the combined gantry mechanism 200 is a main structural assembly for bearing the operation of the entire machine, and consists of a main-post outer-gantry assembly 210, an intermediate gantry cross-beam assembly 220, a combined gantry canting-pull assembly 230, and a combined gantry connection hinge shaft 240. The main-post outer-gantry assembly 210 is a basic assembly of the main frame; the section of the post is polygonal; a grooved slide way for the intermediate gantry cross-beam assembly 220 to move up and down is disposed on the inner side of the post; the main-post outer-gantry assembly bears a comprehensive operating load, and therefore needs to satisfy the requirements for strength and rigidity.

The intermediate gantry cross-beam assembly 220 is a frame-shaped structural assembly, and moves up and down by means of the actions of the gantry lift cylinder 411 of the intermediate gantry lifting mechanism 410, so as to hoist a container. The intermediate gantry cross-beam assembly 220 consists of an intermediate gantry post 221, an intermediate gantry cross-beam 222, and an intermediate gantry slide block 223, wherein the section of the intermediate gantry post 221 is also polygonal; the intermediate gantry slide block 223 is disposed on the outer side thereof, and a grooved slide way for the hoisting frame combination structure 311 and the frame bearing wearable slide block 313 of the sling hoisting mechanism 310 of the sling assembly to move up and down is disposed on the inner side thereof; similarly, the intermediate gantry cross-beam assembly should also satisfy the requirements for wearing, strength and rigidity.

Figure 3A:
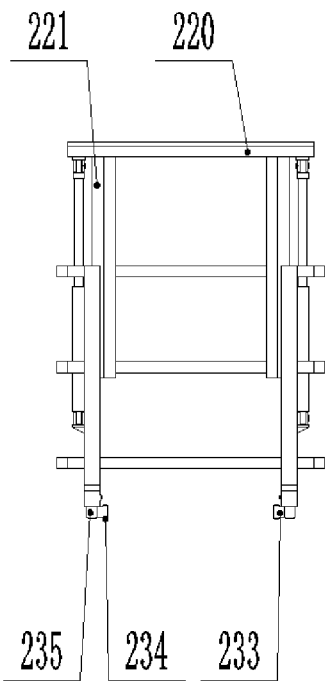
Figure 3B:
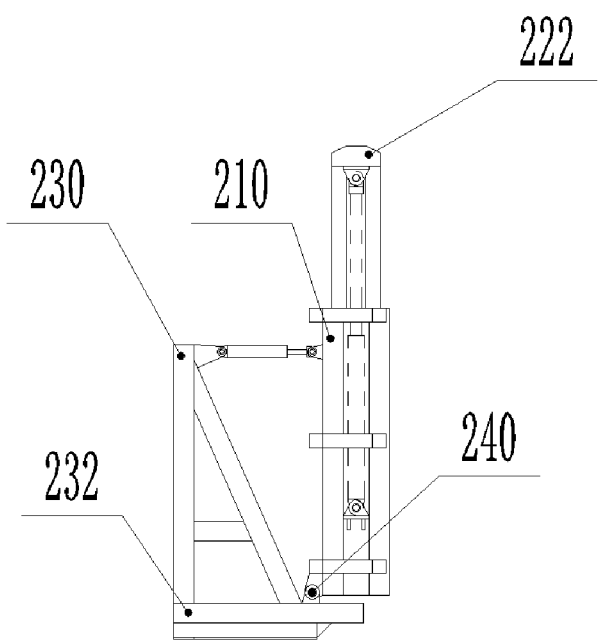
Figure 3C:
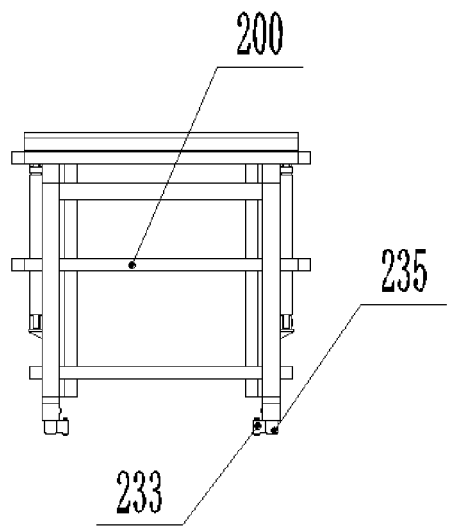
Figure 3D:
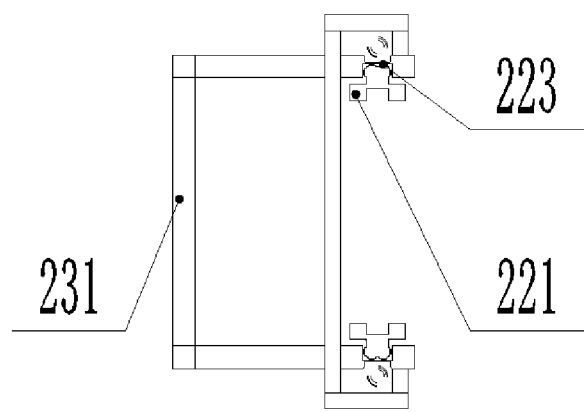
Figure 8A:
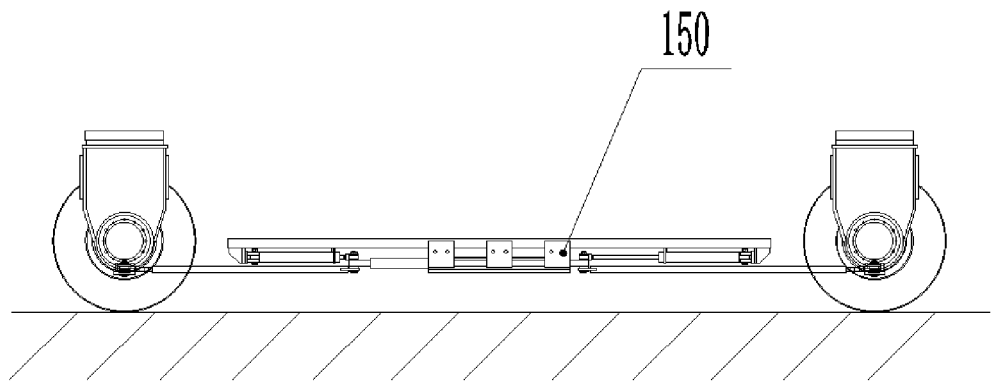
Figure 8B:
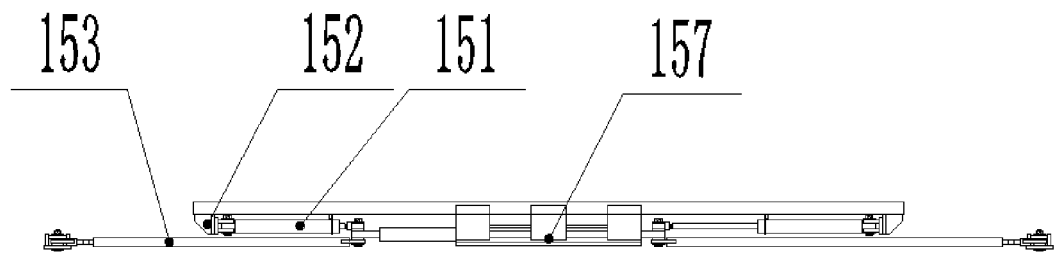
Figure 8C:
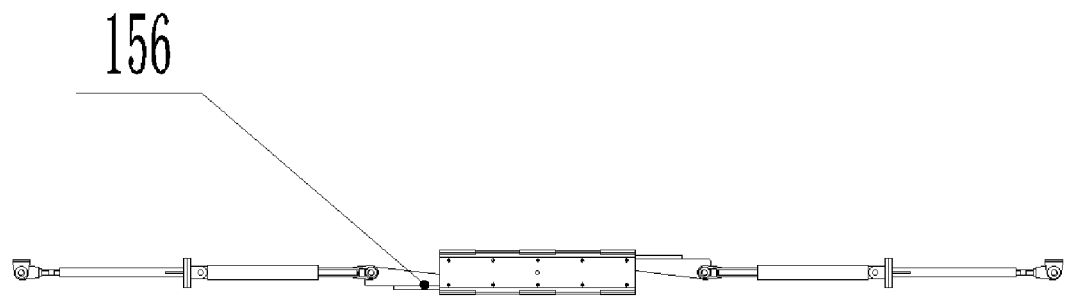
Figure 8D:
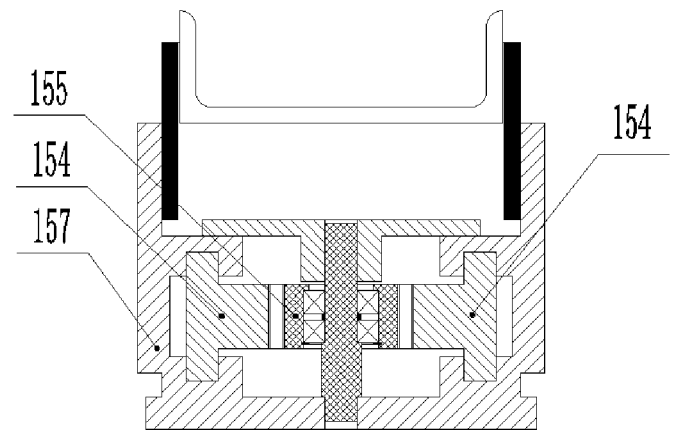

As shown in FIG. 3b, the intermediate gantry cross-beam assembly 220 is connected to the combined gantry canting-pull assembly 230 via the combined gantry connection hinge shaft 240 and the combined gantry inclination mechanism 420; the intermediate gantry cross-beam assembly 220 is hinged to the lower part of the combined gantry canting-pull assembly 230 via the combined gantry connection hinge shaft 240, and is telescopically connected to the upper part thereof via the combined gantry inclination mechanism 420, so as to adjust the inclination of the intermediate gantry cross-beam assembly 220. The combined gantry canting-pull assembly 230 is an intermediate bearing link for transferring the load of a container to the base mechanism 100, and consists of a canting-pull structure combination 231, a canting-pull structure bottom-beam 232, a bearing side cross-beam 233, a bearing wearable slide block 234, and an upper rack mounting base beam 235, wherein the canting-pull structure combination 231 is triangular, so as to provide stability and structural strength; the canting-pull structure bottom-beam 232 is disposed under the bottom of the canting-pull structure combination 231; the bearing side cross-beam 233, the bearing wearable slide block 234 and the upper rack mounting base beam 235 are all disposed under the canting-pull structure combination 231.

Figure 10A:
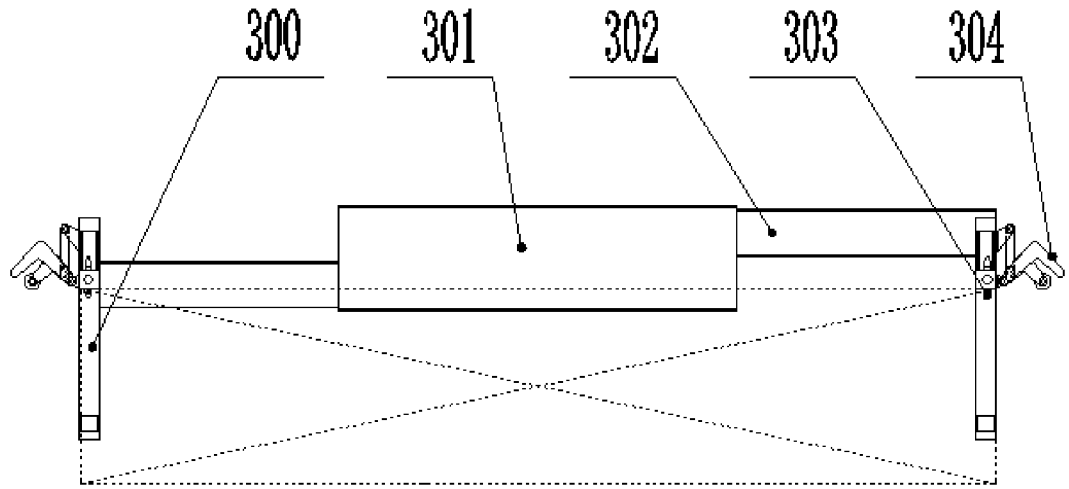
Figure 10B:
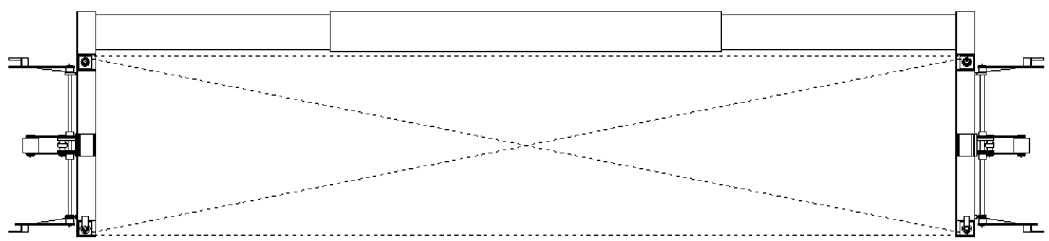
Figure 10C:
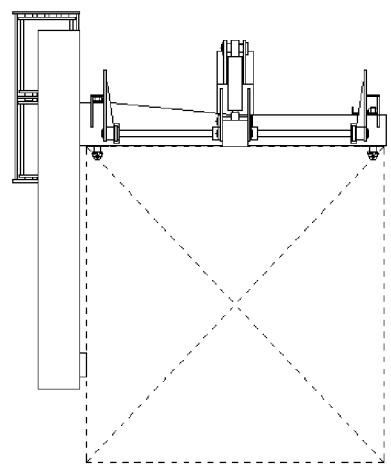

As shown in FIG. 10, the sling mechanism 300 is an automatic extension and retraction sling which can automatically extend and retract to match containers in different sizes, and consists of a sling structure assembly 301, a sling extension and retraction mechanism 302, a sling twist lock mechanism 303, and a container door opening/closing mechanism 304. Wherein the sling structure assembly 301 is fixedly connected to the hoisting frame combination structure 311 of the sling hoisting mechanism 310 of the sling assembly; the sling extension and retraction mechanism 302 can be used for containers in multiple sizes such as 20 inches, 40 inches and the like; the sling twist lock mechanism 303 can connect and fix the containers; and the container door opening/closing mechanism 304 can automatically open and close a container door.

Under the cooperative operations of the power system assembly, the hydraulic control assembly, the electric control assembly, and the wireless remote control of the power system 160, the sling extension and retraction mechanism 302 and the sling twist lock mechanism 303 can act to satisfy the requirements for the operations of container hooking, unhooking, and locking. The container door opening/closing mechanism 304 has the functions of clamping and positioning a door when the container is overturned and the container door faces upward, tightly pressing the container door when the container door faces upward and is closed under self-weight, and when the container door faces downward, tightly pressing rollers and slowly moving until the container door is completely opened and unloading is completed. The bearing capacity of the sling mechanism 300 satisfies the requirement for the maximum operating load, and the electrically and hydraulically self-locking functions are provided.

Figure 11A:
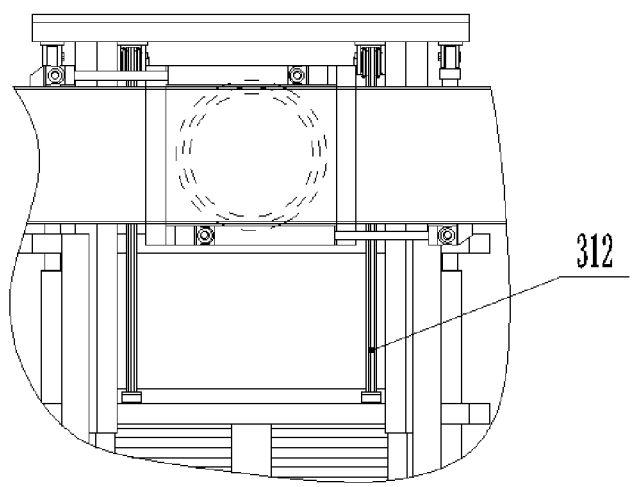
FIGS. 11a-11c are structural schematic views of the sling hoisting mechanism in the embodiment as shown in FIG. 1.
Figure 11B:
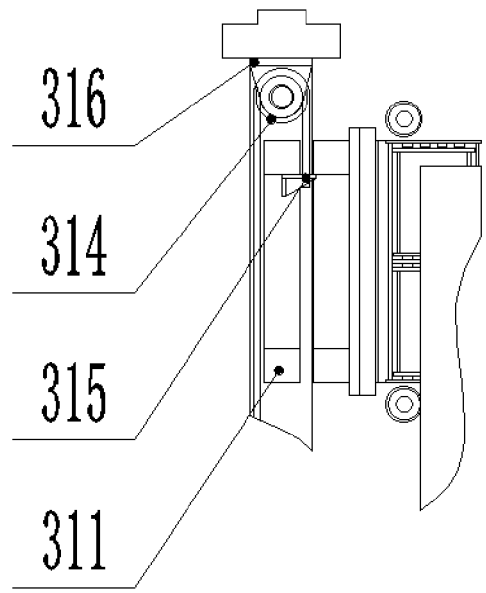
Figure 11C:
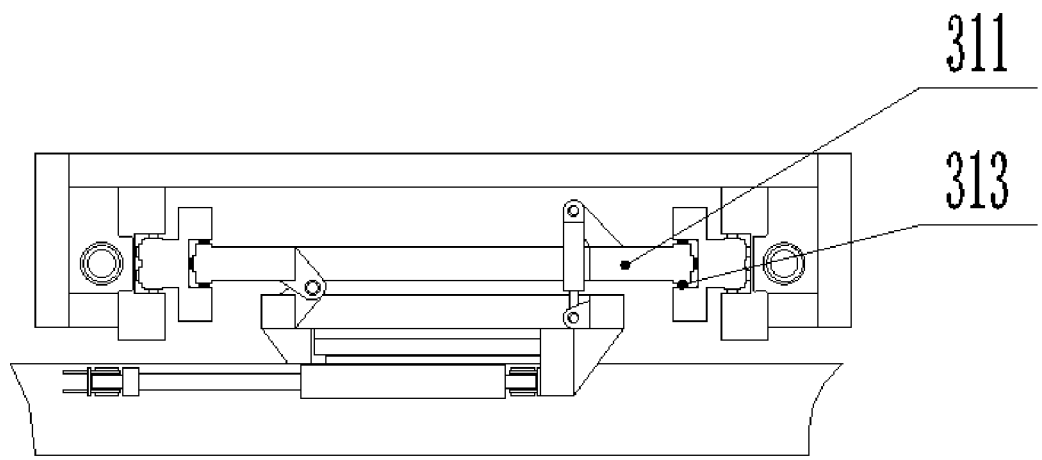

As shown in FIG. 11, the sling hoisting mechanism 310 consists of a hoisting frame combination structure 311, a hoisting crane plate type chain 312, a frame bearing wearable slide block 313, a plat type chain bearing pulley 314, a plat type chain fixing end portion 315, and a plat type chain pulley support 316. The hoisting frame combination structure 311 is fixedly connected to the sling structure assembly 301 of the sling mechanism 300; one end of the hoisting crane plate type chain 312 is fixedly connected to the bottom of the main-post outer-gantry assembly 210; the plat type chain bearing pulley 314 is fixed on the intermediate gantry cross-beam 222 via the plat type chain pulley support 316; after the hoisting crane plate type chain 312 passes the plat type chain bearing pulley 314, the other end is connected to the plat type chain fixing end portion 315 mounted on the hoisting frame combination structure 311.

Therefore, under the cooperative operations of the power system assembly, the hydraulic control assembly, the electric control assembly, and the wireless remote control of the power system 160, when the gantry lift cylinder 411 of the intermediate gantry lifting mechanism 410 extends and retracts, the intermediate gantry cross-beam assembly 220 is driven to move up and down; then the hoisting frame combination structure 311 is driven to move up and down via plat type chain pulley support 316, the plat type chain bearing pulley 314, the hoisting crane plate type chain 312 and the plat type chain fixing end portion 315 fixed on the intermediate gantry cross-beam 222; and finally the sling mechanism 300 moves up and down; the comprehensive bearing capacity thereof satisfies the requirement for the maximum operating load.

Figure 12A:
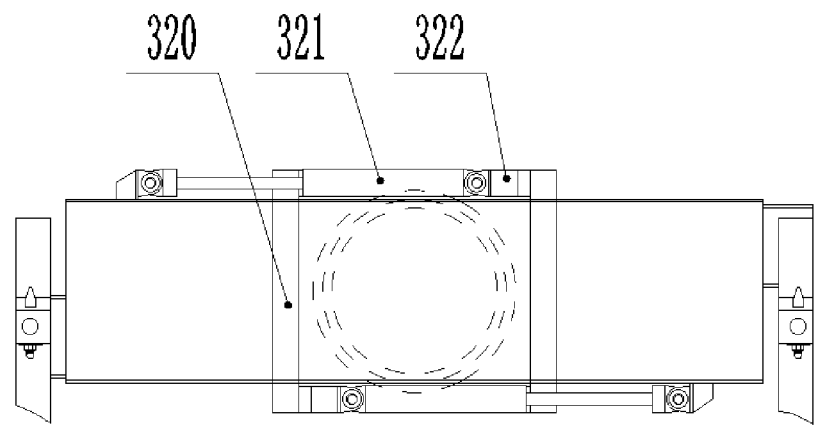
FIGS. 12a-12c are structural schematic views of the sling vertical-rotation mechanism in the embodiment as shown in FIG. 1.
Figure 12B:
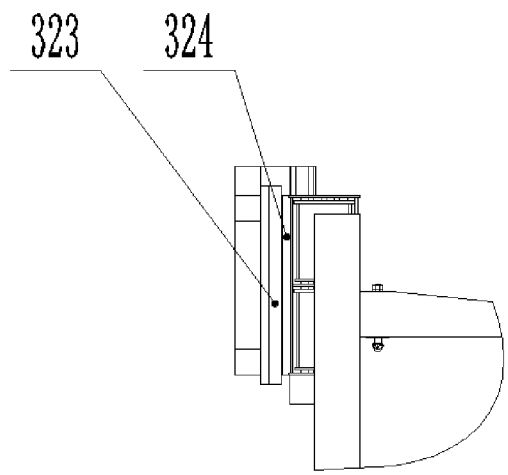
Figure 12C:
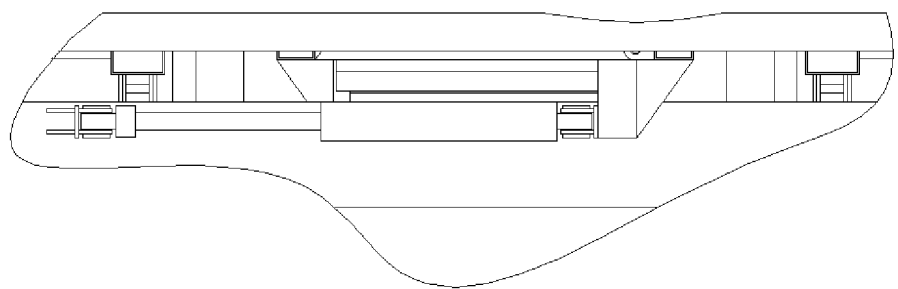

As shown in FIG. 12, the sling vertical-rotation mechanism 320 consists of a sling rotation cylinder 321, a rotation cylinder support 322, a toothless slewing large-bearing 323, and a bearing mounting base 324. The rotation cylinder supports 322 are two, and are respectively mounted on the upper and lower surfaces of the sling structure assembly 301 and the hoisting frame combination structure 311 of the sling hoisting mechanism 310 of the sling assembly; the two ends of the sling rotation cylinder 321 are respectively fixedly connected to the two rotation cylinder supports 322; furthermore, the toothless slewing large-bearing 323 and the bearing mounting base 324 need to bear a comprehensive load caused by rotation.

Therefore, under the cooperative operations of the power system assembly, the hydraulic control assembly, the electric control assembly, and the wireless remote control of the power system 160, when the sling rotation cylinder 321 extends and retracts, the sling mechanism 300 rotates, and drives the heavy container to turn over at a 60-degree angle to the greatest, thus satisfying the requirements for overturning and unloading a heavy container, and overturning and loading an empty container. The comprehensive bearing capacity thereof satisfies the requirement for the maximum operating load, and the electrically and hydraulically self-locking functions are provided.

Figure 13A:
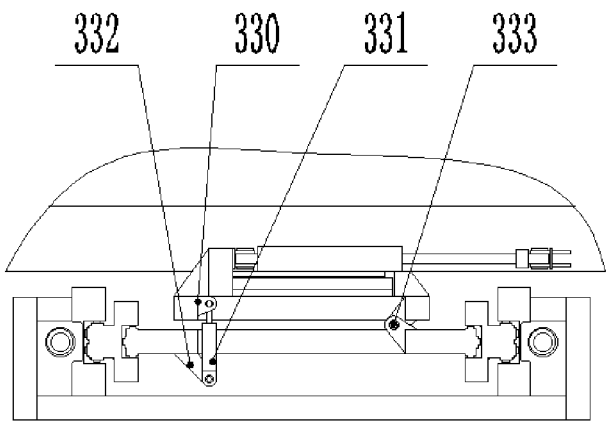
FIGS. 13a-13b are structural schematic views of the sling horizontal-adjustment mechanism in the embodiment as shown in FIG. 1.
Figure 13B:
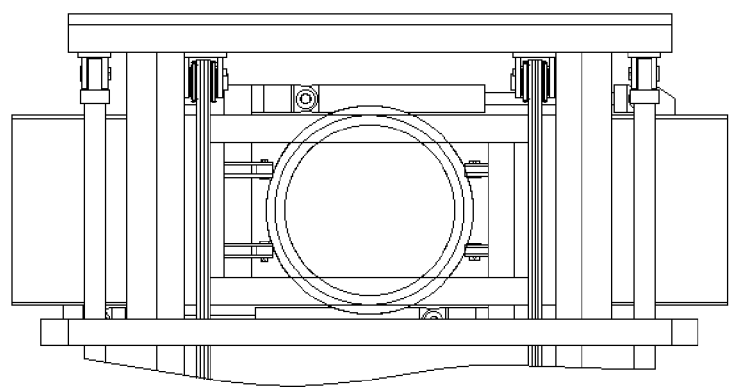
Figure 14:
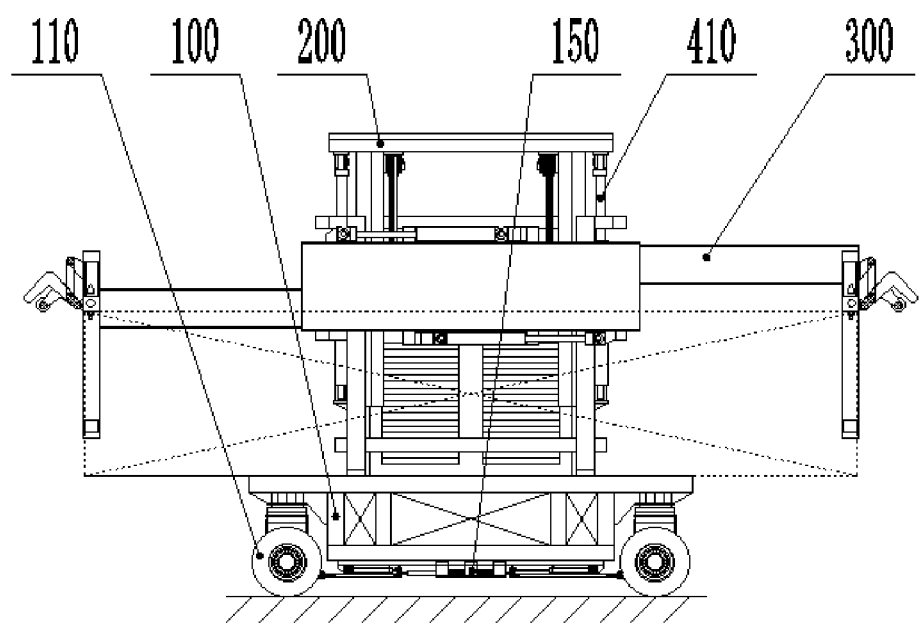
FIG. 14 is a front view when the loader in the embodiment as shown in FIG. 1 loads a 40 inches container.
Figure 15:
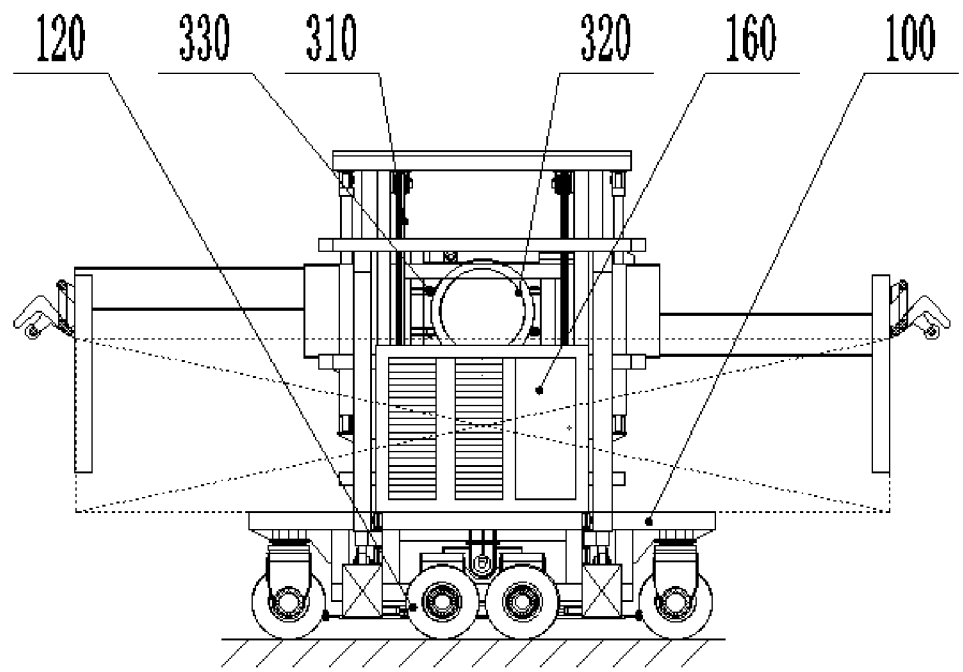
FIG. 15 is a rear view when the loader in the embodiment as shown in FIG. 1 loads a 40 inches container.
Figure 16:
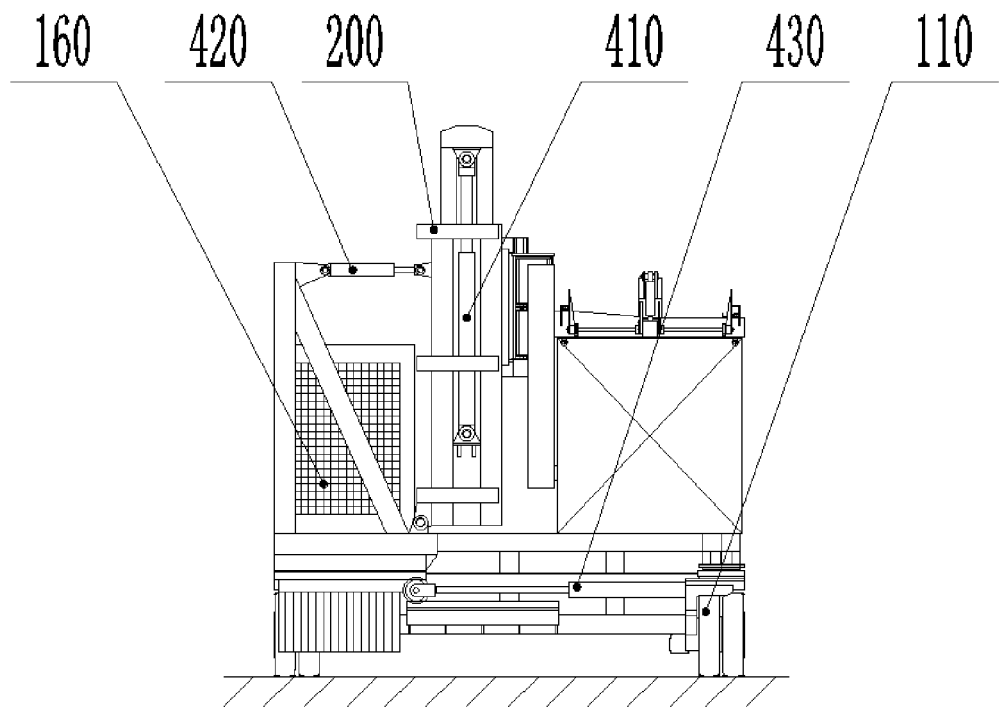
FIG. 16 is a side view when the loader in the embodiment as shown in FIG. 1 loads a 40 inches container.
Figure 17:
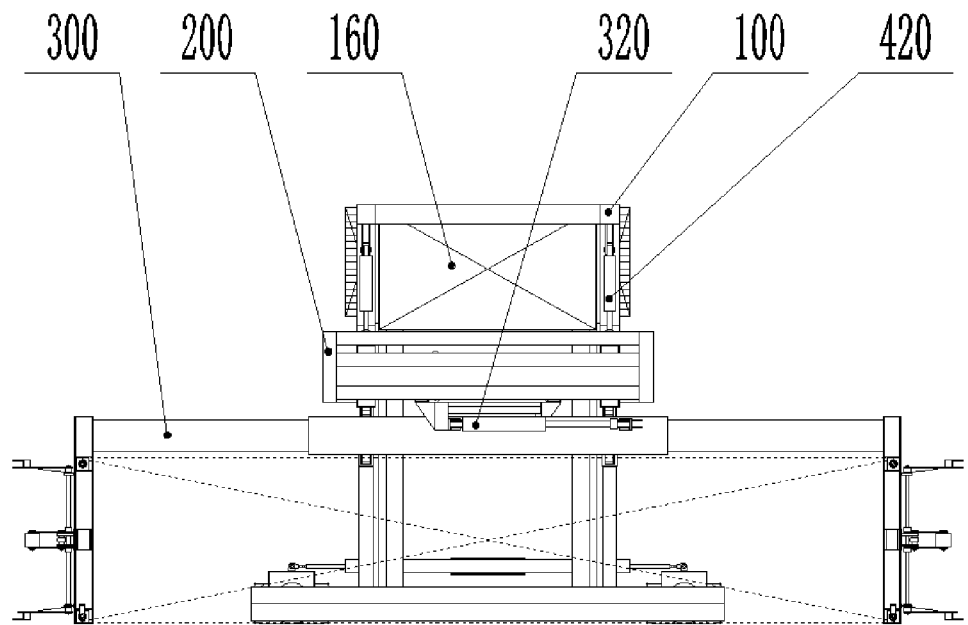
FIG. 17 is a vertical view when the loader in the embodiment as shown in FIG. 1 loads a 40 inches container.
Figure 18:
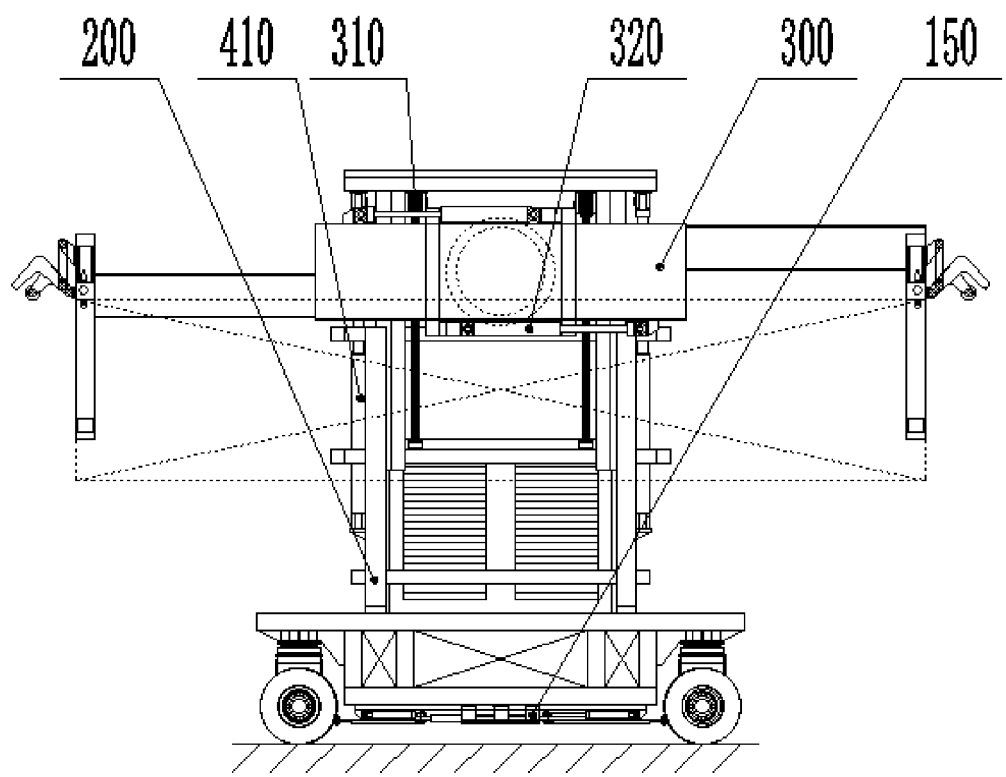
FIG. 18 is a front view when the loader in the embodiment as shown in FIG. 1 loads a 40 inches container at a high position.
Figure 19:
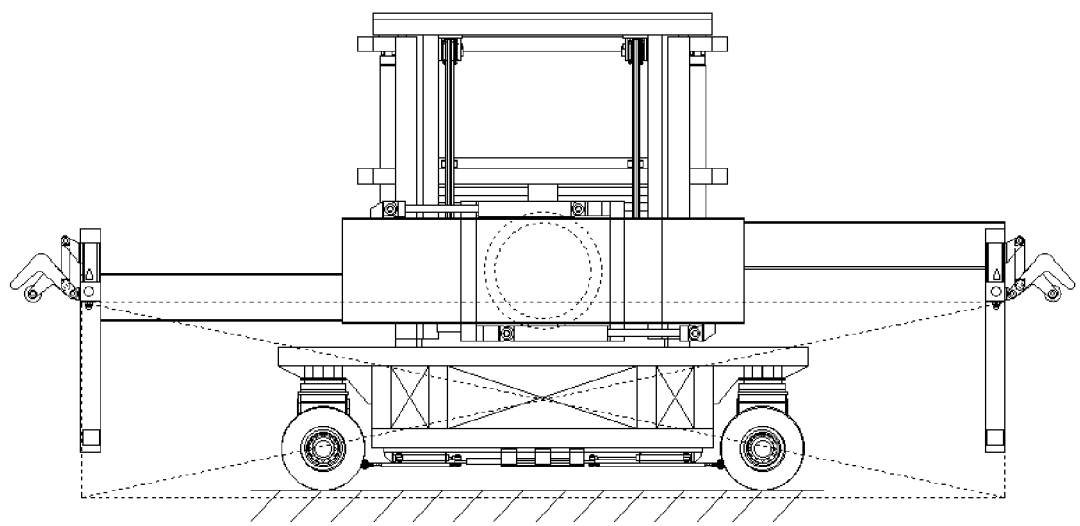
FIG. 19 is a front view when the loader in the embodiment as shown in FIG. 1 loads a 40 inches container at a low position.
Figure 20:
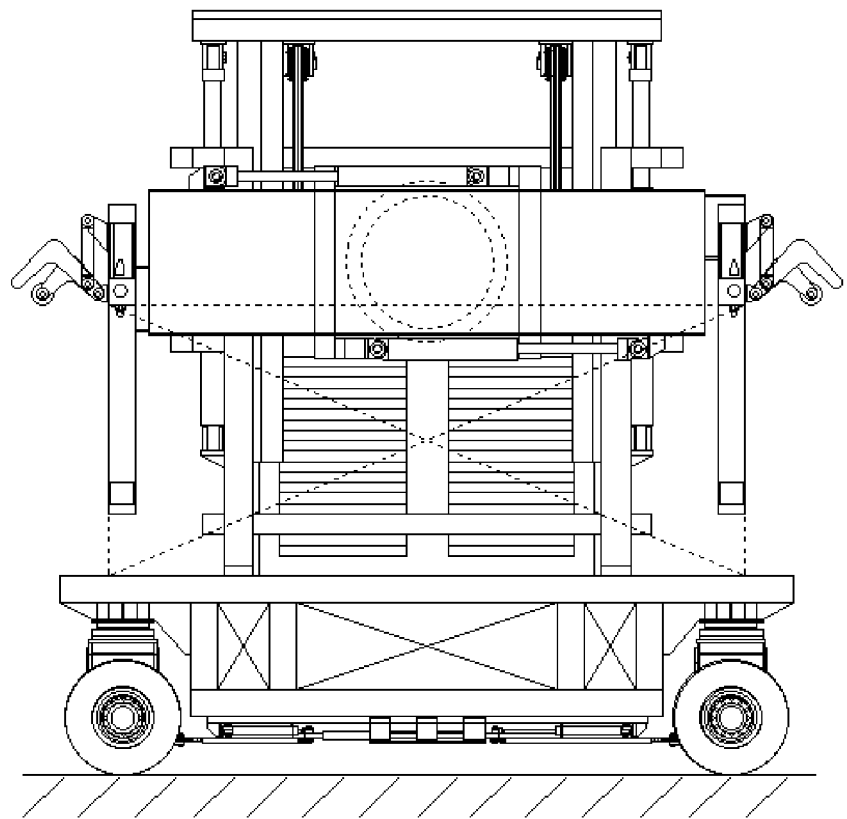
FIG. 20 is a front view when the loader in the embodiment as shown in FIG. 1 loads a 20 inches container.
Figure 21:
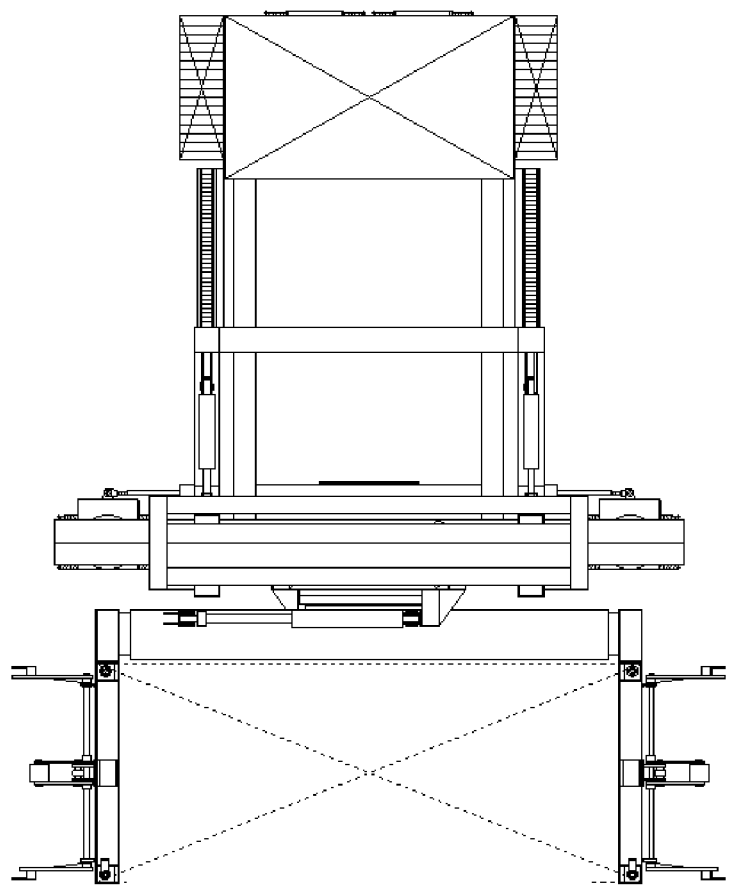
FIG. 21 is a vertical view when the loader in the embodiment as shown in FIG. 1 loads a 20 inches container.
Figure 22:
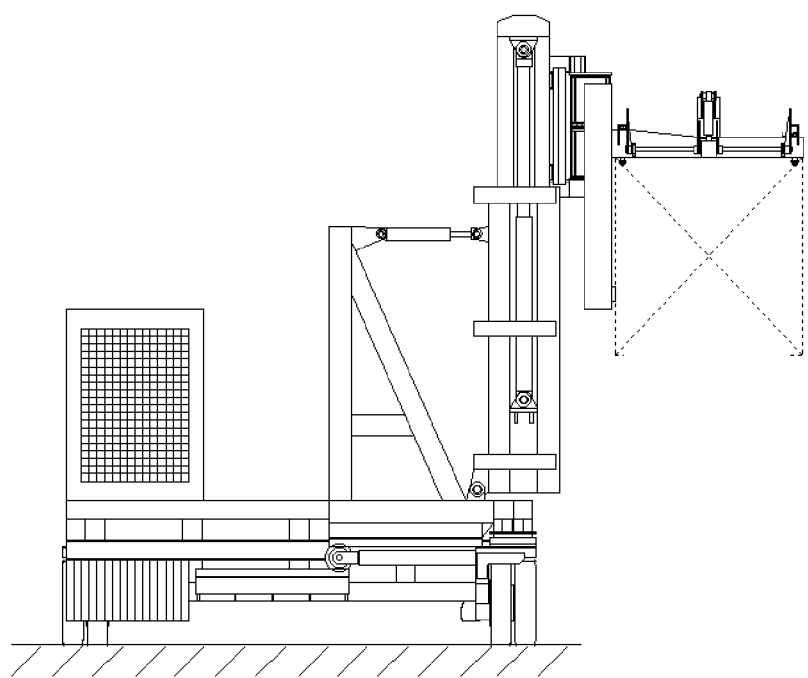
FIG. 22 is a side view when the loader in the embodiment as shown in FIG. 1 loads a 20 inches container.
Figure 23:
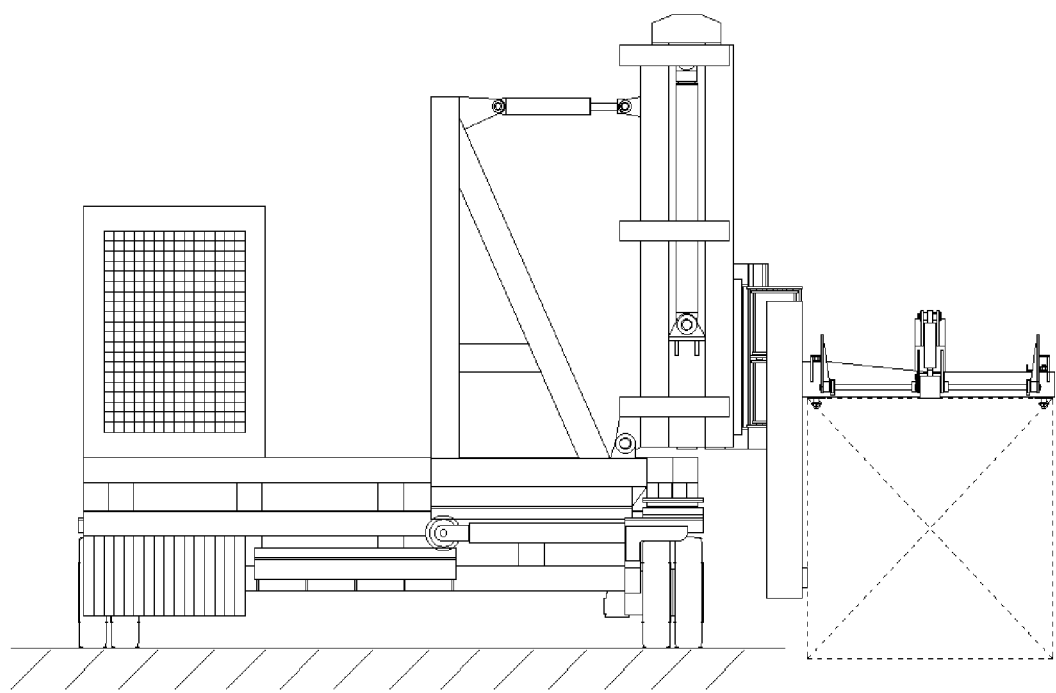
FIG. 23 is a side view when the loader in the embodiment as shown in FIG. 1 loads a 20 inches container at a low position.
Figure 24:
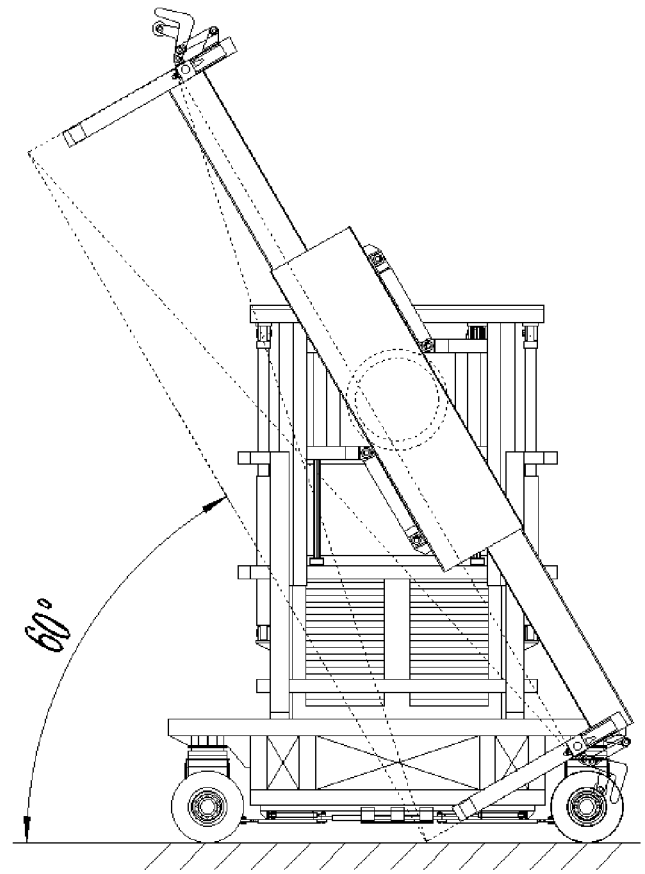
FIGS. 24 and 25 are a flip front view and a flip rear view when the loader in the embodiment as shown in FIG. 1 loads a 40 inches container, and are a front view and a rear view at a maximum flip angle.
Figure 25:
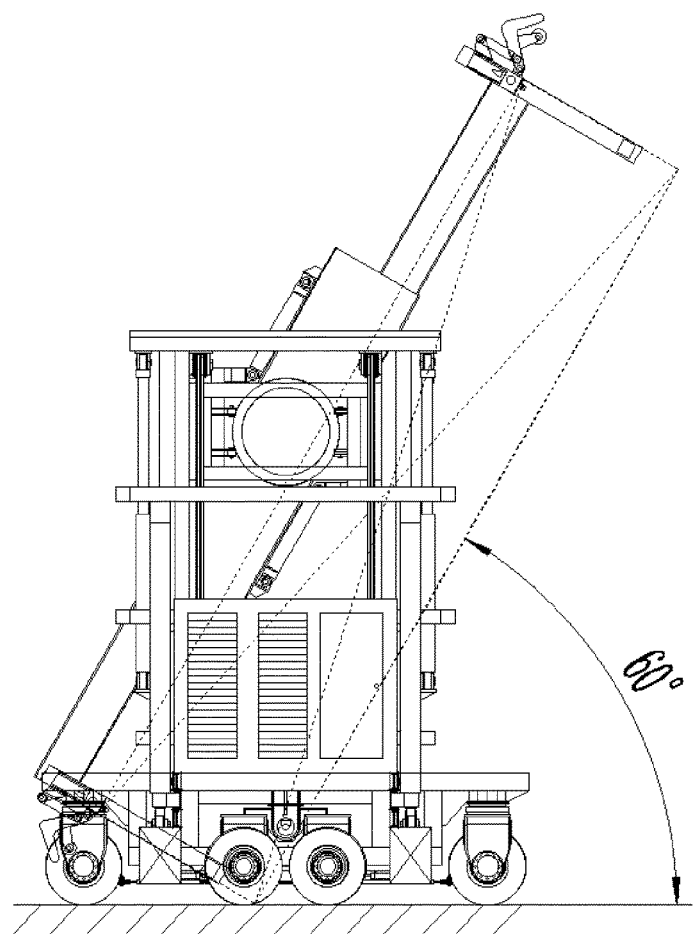
Figure 26:
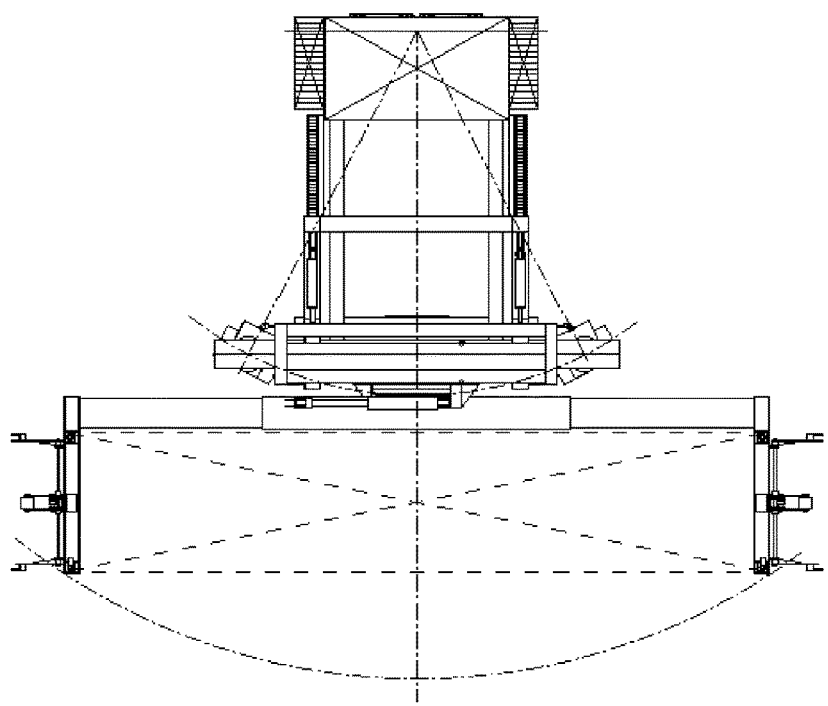
FIGS. 26 and 27 are respectively a turn-left vertical view and a turn-right vertical view when the loader in the embodiment as shown in FIG. 1 loads a 40 inches container, wherein central lines denote turning curves.
Figure 27:
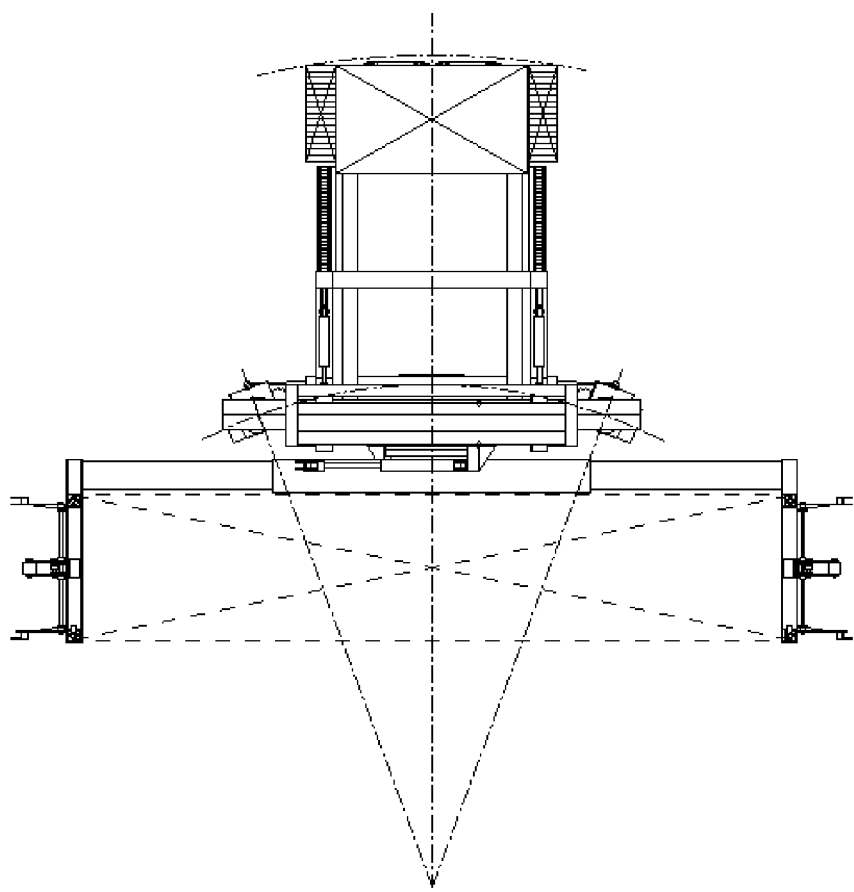

As shown in FIG. 13, the sling horizontal-adjustment mechanism 330 consists of a horizontal adjustment cylinder 331, an adjustment cylinder support 332, and a horizontal adjustment hinge shaft 333. The adjustment cylinder supports 332 are two, and are respectively mounted on the hoisting frame combination structure 311 of the sling hoisting mechanism 310 of the sling assembly, and on the bearing mounting base 324 of the sling vertical-rotation mechanism 320; the two ends of the horizontal adjustment cylinder 331 and the two adjustment cylinder supports 332 are respectively fixedly connected and cooperate at one end of the hoisting frame combination structure 311; and the other end of the hoisting frame combination structure 311 hingedly cooperates with the hoisting frame combination structure 311 via the horizontal adjustment hinge shaft 333. Therefore, under the cooperative operations of the power system assembly, the hydraulic control assembly, the electric control assembly, and the wireless remote control of the power system 160, when the horizontal adjustment cylinder 331 extends and retracts, the sling mechanism 300 performs horizontal left and right rotation around the horizontal adjustment hinge shaft 333, and the sling twist lock of the sling mechanism 300 is driven to align with the container hoisting hole; the comprehensive bearing capacity thereof satisfies a requirement for a maximum operating load, and electrically and hydraulically self-locking functions are provided.

As shown in FIG. 4, the intermediate gantry lifting mechanism 410 consists of a gantry lift cylinder 411 and a lift cylinder support 412; the lift cylinder supports 412 are two, and are respectively disposed at a lower end of the main-post outer-gantry assembly 210 of the combined gantry structure assembly 200, and on the intermediate gantry cross-beam 222 of the intermediate gantry cross-beam assembly 220; and the two ends of the gantry lift cylinder 411 are respectively connected to the two lift cylinder supports 412. Therefore, under the cooperative operations of the power system assembly, the hydraulic control assembly, the electric control assembly, and the wireless remote control of the power system 160, when the gantry lift cylinder 411 extends and retracts, the intermediate gantry cross-beam assembly 220 is driven to move up and down, then the hoisting frame combination structure 311 is driven to move up and down, and finally the sling mechanism 300 moves up and down; the bearing capacity thereof satisfies the requirement for the maximum operating load, and the electrically and hydraulically self-locking functions are provided.

As shown in FIG. 5, the combined gantry inclination mechanism 420 consists of a gantry inclination cylinder 421 and an inclination cylinder support 422. The inclination cylinder supports 422 are two, and are respectively disposed at an upper end of the main-post outer-gantry assembly 210 of the combined gantry structure assembly 200, and an upper end of the canting-pull structure combination 231 of the combined gantry canting-pull assembly 230; and the two ends of the gantry inclination cylinder 421 are respectively connected to the two inclination cylinder supports 422. Therefore, under the cooperative operations of the power system assembly, the hydraulic control assembly, the electric control assembly, and the wireless remote control of the power system 160, when the gantry inclination cylinder 421 extends and retracts, the combined gantry structure assembly 200 is driven to rotate around a combined gantry connection hinge shaft 240 and inclines, and the sling mechanism 300 inclines forward, so as to satisfy a requirement for alignment and unlocking of a sling twist lock and a container hoisting hole. The bearing capacity thereof satisfies the requirement for the maximum operating load, and the electrically and hydraulically self-locking functions are provided.

As shown in FIG. 6, the combined gantry translation mechanism 430 consists of a gantry translation cylinder 431, a translation cylinder support 432, a cylinder head gear 433, an upper moving rack 434, and a lower fixed rack 435. The upper moving rack 434 is disposed under the canting-pull structure bottom-beam 232 of the combined gantry canting-pull assembly 230; the lower fixed rack 435 is disposed on the rack beam 133 of the intermediate connector 130; the translation cylinder support 432 is disposed on one side of the intermediate connector 130 of the base mechanism 100 adjacent to the steering wheel bearing structure 101 (namely disposed on the inner side of the base); one end of the gantry translation cylinder 431 connected to the translation cylinder support 432, and the other end is connected to the cylinder head gear 433; furthermore, the cylinder head gear 433 is disposed between the upper moving rack 434 and the lower fixed rack 435, such that the gantry translation cylinder 431 can drive the two racks to move relatively.

Therefore, under the cooperative operations of the power system assembly, the hydraulic control assembly, the electric control assembly, and the wireless remote control of the power system 160, when the gantry translation cylinder 431 extends and retracts, the cylinder head gear 433 drives the upper moving rack 434 to move left and right relative to the lower fixed rack 435, and then drives the combined gantry structure assembly 200 to entirely move left and right, so as to finally satisfy a requirement for the left and right movement of the sling mechanism 300 and the loaded container. The bearing capacity thereof also satisfies the requirement for the maximum operating load, and the electrically and hydraulically self-locking functions are provided.

In addition, in the loader, the base mechanism 100 and the combined gantry structure assembly 200 are mount bearing components of all the mechanisms and apparatuses, and the other components are directly or indirectly mounted on the two; the steering and driving wheel assembly 110 and the fixed and combined wheel assembly 120 form a wheel drive assembly.

The steering and driving wheel assembly 110 and the synchronously-steering assembly 150 are disposed under the steering wheel bearing mechanism 101; and the fixed and combined wheel assembly 120 is disposed under the combined wheel bearing mechanism 102. The upper bearing track 131 and the lower bearing track 132 of the intermediate connector 130 bear the maximum load transferred from bearing side cross-beam 233 and the bearing wearable slide block 234 of the combined gantry structure assembly 200. The rack beam 133 and the upper rack mounting base beam 235 are used to mount the upper moving rack 434 and the lower fixed rack 435. The intermediate connector 130 is a connector which can be split into a left and a right structures, and has high enough strength and rigidity. The rear-mounted counterweight assembly 104 is an assembly to ensure the stability of the entire machine during operation, and is also an assembly in a separable structure form.

The invention claimed is:

1. A container side loader, comprising a base mechanism (100), a steering and driving wheel assembly (110), a fixed and combined wheel assembly (120), a synchronously-steering assembly (150), a power system (160), a combined gantry mechanism (200), a sling mechanism (300), a sling hoisting mechanism (310), a sling vertical-rotation mechanism (320), a sling horizontal-adjustment mechanism (330), an intermediate gantry lifting mechanism (410), a combined gantry inclination mechanism (420), and a combined gantry translation mechanism (430), wherein the base mechanism (100) has an overall support effect for the entire machine;
the steering and driving wheel assembly (110) and the fixed and combined wheel assembly (120) form a wheel drive assembly of the loader; the synchronously-steering assembly (150) adjusts, by means of the extension and retraction of a synchronously-steering cylinder (151), a distance between idle ends of two synchronously-steering links (153) of the synchronously-steering assembly (150), so as to control the steering of the steering and driving wheel assembly (110);
the combined gantry mechanism (200) is structural assembly for bearing the operation of the entire machine; the sling mechanism (300) is an automatic telescopic sling capable of automatically extending and retracting to match containers in different sizes, and is assembled on the combined gantry mechanism (200); the sling hoisting mechanism (310) is used to control the hoisting of the sling; the sling vertical-rotation mechanism (320) and the sling horizontal-adjustment mechanism (330) are respectively used to adjust the vertical and horizontal positions of the sling; the intermediate gantry lifting mechanism (410), the combined gantry inclination mechanism (420), and the combined gantry translation mechanism (430) are respectively used to control the lift, inclination and translation of the sling;
the power system (160) is an operation power and control center of the entire machine, and consists of a power system assembly, a hydraulic control assembly, an electric control assembly, a wireless remote control, and a machine room cover assembly.

2. The container side loader according to claim 1, wherein the base mechanism (100) comprises a steering wheel bearing mechanism (101), a combined wheel bearing mechanism (102), an intermediate connector (130), and a counterweight assembly (104); the intermediate connector (130) comprises an upper bearing track (131), a lower bearing track (132), a rack beam (133), and a connecting beam (134); the upper bearing tracks (131) and the lower bearing tracks (132) are respectively two, and are arranged in parallel with each other; and the steering wheel bearing mechanism (101) and the combined wheel bearing mechanism (102) are respectively disposed on the two sides of the upper bearing track (131) and the lower bearing track (132), so as to form a rectangular base main-frame.

3. The container side loader according to claim 2, wherein the steering wheel bearing mechanism (101) is disposed on the inner side of the base (100); the combined wheel bearing mechanism (102) is disposed on the outer side of the base (100); the counterweight assembly (104) is disposed on the outer side of the base (100); and the rack beam (133) is disposed on the base mechanism (100).

4. The container side loader according to claim 1, wherein the steering and driving wheel assembly (110) comprises a wheel drive apparatus (111), a double-tyre rim combination (112), a right angle support structure (113), and a toothless slewing bearing (114); and the fixed and combined wheel assembly (120) comprises a fixed support base (121), a combined balance cross-beam (122), a swing support center shaft (123), a double-tyre rim combination (112), and a right angle support structure (113).

5. The container side loader according to claim 4, wherein the synchronously-steering assembly (150) comprises a synchronously-steering cylinder (151), a steering cylinder support (152), a synchronously-steering link (153), a synchronously-steering rack (154), a synchronously-steering gear (155), a rack slide way assembly (156), and a mechanism mounting base (157); the synchronously-steering cylinder (151) extends and retracts to adjust the distance between the idle ends of two synchronously-steering links (153) of the synchronously-steering assembly (150); the synchronously-steering rack (154) and the rack slide way assembly (156) on the two sides, and synchronously-steering gear (155) disposed in the middle perform mechanical forced synchronization, so as to realize absolutely synchronous and symmetric steering of the two steering and driving wheel assemblies (110).

6. The container side loader according to claim 1, wherein the combined gantry mechanism (200) comprises a main-post outer-gantry assembly (210), an intermediate gantry cross-beam assembly (220), a combined gantry canting-pull assembly (230), and a combined gantry connection hinge shaft (240);
   the intermediate gantry cross-beam assembly (220) comprises an intermediate gantry post (221), an intermediate gantry cross-beam (222), and an intermediate gantry slide block (223);
   the combined gantry canting-pull assembly (230) comprises a canting-pull structure combination (231), a canting-pull structure bottom-beam (232), bearing side cross-beam (233), a bearing wearable slide block (234), and an upper rack mounting base beam (235).

7. The container side loader according to claim 1, wherein the sling mechanism (300) comprises a sling structure assembly (301), a sling extension and retraction mechanism (302), a sling twist lock mechanism (303), and a container door opening/closing mechanism (304).

8. The container side loader according to claim 1, wherein the sling hoisting mechanism (310) comprises a hoisting frame combination structure (311), a hoisting crane plate type chain (312), a frame bearing wearable slide block (313), a plat type chain bearing pulley (314), a plat type chain fixing end portion (315), and a plat type chain pulley support (316); when a gantry lift cylinder (411) extends and retracts, an intermediate gantry cross-beam assembly (220) is driven to move up and down, and the hoisting frame combination structure (311) is driven to move up and down via the plat type chain pulley support (316) fixed on an intermediate gantry cross-beam (222), the plat type chain bearing pulley (314), the hoisting crane plate type chain (312), and the plat type chain fixing end portion (315), so as to realize the up and down movement of the sling mechanism (300).

9. The container side loader according to claim 1, wherein the sling vertical-rotation mechanism (320) comprises a sling rotation cylinder (321), a rotation cylinder support (322), a toothless slewing large-bearing (323), and a bearing mounting base (324);
   the sling horizontal-adjustment mechanism (330) comprises a horizontal adjustment cylinder (331), an adjustment cylinder support (332), and a horizontal adjustment hinge shaft (333); and when the sling rotation cylinder (321) extends and retracts, the sling mechanism (300) is driven to rotate, so as to turn over the container.

10. The container side loader according to claim 1, wherein the intermediate gantry lifting mechanism (410) comprises a gantry lift cylinder (411) and a lift cylinder support (412); when the gantry lift cylinder (411) extends and retracts, an intermediate gantry cross-beam assembly (220) is driven to move up and down, then a hoisting frame combination structure (311) is driven to move up and down, and finally the sling mechanism (300) moves up and down;
   the combined gantry inclination mechanism (420) comprises a gantry inclination cylinder (421) and an inclination cylinder support (422); when the gantry inclination cylinder (421) extends and retracts, a combined gantry structure assembly (200) is driven to rotate around a combined gantry connection hinge shaft (240) and inclines, such that the sling mechanism (300) inclines forward, so as to satisfy a requirement for alignment or unlocking of a sling twist lock and a container hoisting hole;
   the combined gantry translation mechanism (430) comprises a gantry translation cylinder (431), a translation cylinder support (432), a cylinder head gear (433), an upper moving rack (434), and a lower fixed rack (435); when the gantry translation cylinder (431) extends and retracts, the cylinder head gear (433) drives the upper moving rack (434) to move left and right relative to the lower fixed rack (435), and drives the combined gantry structure assembly (200) to entirely move left and right, so as to satisfy a requirement for the left and right movement of the sling mechanism (300) and the loaded container.

\* \* \* \* \*